United States Patent
Liu et al.

(10) Patent No.: US 9,531,185 B2
(45) Date of Patent: Dec. 27, 2016

(54) CURRENT LIMITING CONTROL METHOD FOR DIODE NEUTRAL-POINT-CLAMPED THREE-LEVEL INVERTER AND RELATED CIRCUIT

(71) Applicant: Huawei Technologies Co., Ltd., Shenzhen, Guangdong (CN)

(72) Inventors: Kelei Liu, Shenzhen (CN); Fuzhou Wang, Xi'an (CN); Yihang Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 14/224,953

(22) Filed: Mar. 25, 2014

(65) Prior Publication Data
US 2014/0204636 A1    Jul. 24, 2014

Related U.S. Application Data

(63) Continuation of application No. PCT/CN2013/080873, filed on Aug. 6, 2013.

(30) Foreign Application Priority Data

Sep. 19, 2012  (CN) .......................... 2012 1 0349131

(51) Int. Cl.
*H02M 1/32*    (2007.01)
*H02H 7/122*    (2006.01)
(Continued)

(52) U.S. Cl.
CPC ............... *H02H 7/122* (2013.01); *H02H 9/02* (2013.01); *H02M 1/32* (2013.01); *H02M 7/487* (2013.01)

(58) Field of Classification Search
CPC .. H02M 1/32; H02M 7/5387; H02M 7/53871; H02M 1/34; H02M 3/33507; H02M 3/1582; H02M 3/1584; H02M 3/285; H02M 3/33561; H02M 7/49; H02M 7/493; H02H 7/1213; H02H 7/1216; H02H 7/122; H02H 7/1222; H02J 3/46; H02J 3/38
(Continued)

(56) References Cited

U.S. PATENT DOCUMENTS 6,490,185 B1 * 12/2002 Yamanaka ............ H02M 7/487
363/132
2004/0124805 A1    7/2004 Edwards et al.
(Continued)

FOREIGN PATENT DOCUMENTS

CN         101051794 A        10/2007
CN         101588124 A        11/2009
(Continued)

*Primary Examiner* — Jeffrey Gblende
(74) *Attorney, Agent, or Firm* — Leydig, Voit & Mayer, Ltd.

(57) ABSTRACT

The present disclosure discloses a current limiting control method for a diode neutral-point-clamped three-level inverter and a related circuit. When a current in switching tubes is lowered to a value not greater than a first preset current value, the current limiting control method for a diode neutral-point-clamped three-level inverter and the related circuit drive an inside switching tube of the switching tubes to be turned on; after a first delay time, drive another inside switching tube to be turned on; after a second delay time, control an inside switching tube to be turned off and the other inside switching tube to be normally turned on; and control all the switching tubes to be turned on or off according to a control time sequence of the diode neutral-point-clamped three-level inverter circuit.

11 Claims, 12 Drawing Sheets

(51) Int. Cl.
 *H02M 7/487* (2007.01)
 *H02H 9/02* (2006.01)
(58) Field of Classification Search
 USPC .................. 363/50, 55, 56.01, 56.02, 56.03,
 56.09, 363/56.1, 65, 71
 See application file for complete search history.

(56) References Cited

U.S. PATENT DOCUMENTS

| | | | | |
|---|---|---|---|---|
| 2006/0067093 | A1* | 3/2006 | Tanaka | H02M 1/44 363/41 |
| 2007/0159749 | A1* | 7/2007 | Oka | H02M 7/487 361/93.1 |
| 2008/0218118 | A1* | 9/2008 | Vaez-Zadeh | H02P 25/04 318/801 |
| 2013/0155551 | A1* | 6/2013 | Grbovic | H02H 11/008 361/18 |
| 2014/0003103 | A1* | 1/2014 | Aaltio | H02M 1/32 363/56.03 |

FOREIGN PATENT DOCUMENTS

| | | |
|---|---|---|
| CN | 102386754 A | 3/2012 |
| CN | 102624273 A | 8/2012 |
| CN | 102868291 A | 1/2013 |

\* cited by examiner

US 9,531,185 B2

1

CURRENT LIMITING CONTROL METHOD FOR DIODE NEUTRAL-POINT-CLAMPED THREE-LEVEL INVERTER AND RELATED CIRCUIT

CROSS-REFERENCE TO RELATED APPLICATION

This application is a continuation of International Patent Application No. PCT/CN2013/080873, filed on Aug. 6, 2013, which claims priority to Chinese Patent Application No. 201210349131.1, filed on Sep. 19, 2012, both of which are hereby incorporated by reference in their entireties.

TECHNICAL FIELD

The present disclosure relates to the field of current limiting technologies for inverters, and in particular, to a current limiting control method for a diode neutral-point-clamped three-level inverter and a related circuit.

BACKGROUND

An inverter is configured to convert direct current power into alternating current power. Circuits of the inverter mainly include an inverter bridge, a control logic circuit, and a filter circuit.

Referring to FIG. 1, a schematic diagram of a main circuit of a typical diode neutral-point-clamped three-level inverter is shown. The main circuit mainly includes four switching tubes, namely, a first switching tube Q1, a second switching tube Q2, a third switching tube Q3, and a fourth switching tube Q4, as well as diodes D5 and D6. Besides, at two ends of each switching tube, a diode is connected in antiparallel with the switching tube, such as diodes D1, D2, D3, and D4 shown in FIG. 1. On and off states of the four switching tubes are respectively controlled through four paths of drive signals. The switching tubes Q1 and Q4 are outside a bridge arm and are called outer tubes (hereinafter referred to as outer tubes); Q2 and Q3 are inside the bridge arm and are called inner tubes (hereinafter referred to as inner tubes).

Specifically, when an output voltage of the diode neutral-point-clamped three-level inverter is in a positive half cycle, the switching tube Q2 is normally turned on, the switching tube Q4 is normally turned off, the switching tubes Q1 and Q3 are turned on in a complementary manner and dead time is ensured; when the output voltage of the diode neutral-point-clamped three-level inverter is in a negative half cycle, the switching tube Q3 is normally turned on, the switching tube Q1 is normally turned off, the switching tubes Q2 and Q4 are turned on in a complementary manner and dead time is ensured. The dead time is a protection time period set to ensure that switching tubes above and under a bridge arm are not simultaneously turned on due to a problem of turn on/off delay in the switching tubes during a process of controlling the switching tubes in a bridge circuit.

Referring to FIG. 2, a schematic diagram of a control logic circuit in the circuit shown in FIG. 1 is shown. The control logic circuit mainly includes a first controller 1, a second controller 2, an inverter current detecting circuit 3, and an overcurrent occurrence detecting circuit 4. Basic control strategies are as follows: the first controller 1 generates two paths of SPWM (Sinusoidal Pulse Width Modulation, sinusoidal pulse width modulation) drive pulses that include a dead time, namely, PWM1 and PWM2, as well as an output voltage positive/negative half cycle enabling signal EN. When the EN is at a low level, an output voltage of the three-level inverter is in a positive half cycle. When the EN is at a high level, the output voltage of the three-level inverter is in a negative half cycle. According to the three-level inverter logic and by using the PWM1, PWM2, the second controller 2 generates four paths of drive pulses, which are Q1PWM, Q2PWM, Q3PWM, and Q4PWM and respectively drive the switching tubes Q1, Q2, Q3, and Q4.

The inverter current detecting circuit 3 detects a current that flows through the switching tubes in real time and sends a detected inverter current signal Iinv to the overcurrent occurrence detecting circuit 4. When the detected inverter current has a value greater than a preset current value, the overcurrent occurrence detecting circuit generates an overcurrent signal OC and provides the signal to the second controller 2. The second controller 2 blocks drive pulses of all switching tubes in an inverter 5 to turn off all the switching tubes. When the overcurrent disappears, the overcurrent signal OC output by the overcurrent occurrence detecting circuit 4 is flipped, so that the second controller 2 generates normal drive pulses to restore the switching tubes in the inverter to normal on/off states.

Referring to FIG. 3, a schematic diagram of drive pulse waveforms in a current limiting solution in the prior art is shown. As shown in FIG. 3, when an overcurrent signal OC is at a high level, which indicates that an inverter current has a value greater than a preset current value, a current-limiting state is entered. When the overcurrent signal OC is at a low level, which indicates that the inverter current has a value smaller than the preset current value, the current-limiting state is exited.

As shown in FIG. 3, at the time point t1, the overcurrent signal OC is flipped and the current limiting logic is executed. Time is delayed until the time point t2, after it is confirmed that the overcurrent signal OC is not an interference signal and is flipped, the outer tubes Q1 and Q4 are turned off; time is delayed until the time point t3, the inner tubes Q2 and Q3 are turned off; at the time point t4, the overcurrent signal OC is flipped, and the inner tubes Q2 and Q3 are turned on at the same time; time is delayed until the time point t5, if the output voltage is in a positive half cycle, Q3 is turned off; if the output voltage is in a negative half cycle, Q2 is turned off; time is delayed until the time point t6, the drive logic of the four tubes is restored at the same time. When the current-limiting state is exited, the two inside switching tubes (hereinafter referred to as inner tubes for short) Q2 and Q3 are changed from the off state to the on state at the same time. At this time, the outside switching tube (hereinafter referred to as outer tube for short) Q1 or Q4 bears single bus voltage plus an additional voltage generated by a line parasitic parameter, which easily causes relatively high voltage stress on the outer tube and further causes an outer tube failure.

SUMMARY

In order to solve the above technical problems, embodiments of the present disclosure provide a current limiting control method for a diode neutral-point-clamped three-level inverter and a related circuit, so as to ensure that voltage stress of a switching tube does not exceed a limit when a current-limiting state is exited. Technical solutions are described as follows:

An aspect of the present disclosure provides a current limiting method for a diode neutral-point-clamped three-level inverter circuit. The circuit includes a bridge arm formed by four switching tubes connected in series sequentially, where the four switching tubes include two end switching tubes and two inside switching tubes. The method includes:

when a current in the four switching tubes decreases to a value not greater than a first preset current value, driving one inside switching tube to be turned on, and after a first delay time, driving the other inside switching tube to be turned on;

after a second delay time, controlling one inside switching tube to be turned off and the other inside switching tube to be turned on; and controlling all four of the switching tubes to be turned on or off according to a control time sequence of the diode neutral-point-clamped three-level inverter circuit.

Another aspect of the present disclosure provides a diode neutral-point-clamped three-level inverter circuit, which at least includes a bridge arm formed by four switching tubes connected in series sequentially and a detection control circuit, where the detection control circuit includes: a first controller, a second controller, an inverter current collecting circuit, and an overcurrent occurrence detecting circuit, where the inverter current collecting circuit is configured to collect a current in the switching tubes and provide the overcurrent occurrence detecting circuit with the collected current;

the overcurrent occurrence detecting circuit is configured to detect whether the current collected by the inverter current collecting circuit in the switching tubes exceeds a preset current value, and if the preset current value is exceeded, generate a corresponding overcurrent detection signal and provide the second controller with the overcurrent detection signal;

the first controller is configured to generate at least two paths of sinusoidal pulse width modulation SPWM pulse signals that include dead time; and the second controller is configured to: when receiving an overcurrent detection signal which indicates that the current in the switching tubes decreases from a value greater than the preset current value to a value not greater than the preset current value, drive one switching tube of switching tubes inside the bridge arm to be turned on; after a first delay time, drive the other switching tube of the inside switching tubes to be turned on; after a second delay time, control one switching tube of the inside switching tubes to be turned off and the other switching tube to be normally turned on; and finally control all the switching tubes to be turned on or off according to a normal time sequence.

As can be seen from the above technical solutions provided in the embodiments of the present disclosure, in the current limiting control method for a diode neutral-point-clamped three-level inverter, when an overcurrent signal turns from valid to invalid, only one inside switching tube in a bridge arm is firstly turned on; after a certain time, the other inside switching tube in the bridge arm is then turned on; and finally normal drive time sequence pulses of all the switching tubes are restored. In this turn-on manner, at a time when the overcurrent signal turns from valid to invalid, only one inside switching tube is turned on, so that the inside switching tube and the outside switching tube that are turned on bear single bus voltage together. Compared with a conventional practice in which two switching tubes bear double bus voltage, the current limiting control method provided in the present application reduces voltage stress of the switching tubes and ensures that the voltage stress of the switching tubes does not exceed a limit when the current-limiting state is exited, so as to prevent the switching tubes from failing due to excessively high voltage stress.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
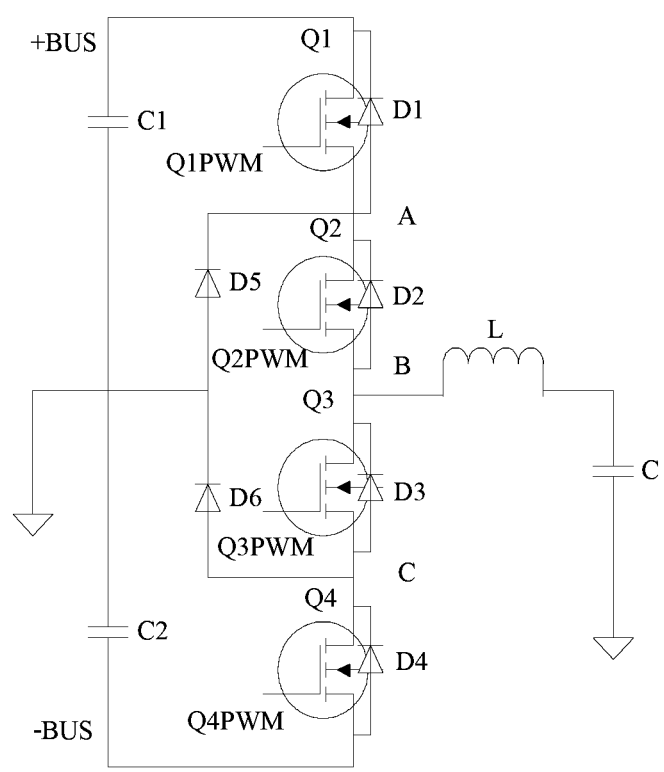
FIG. 1 is a schematic diagram of a main circuit of a typical diode neutral-point-clamped three-level inverter in the prior art.
Figure 2:
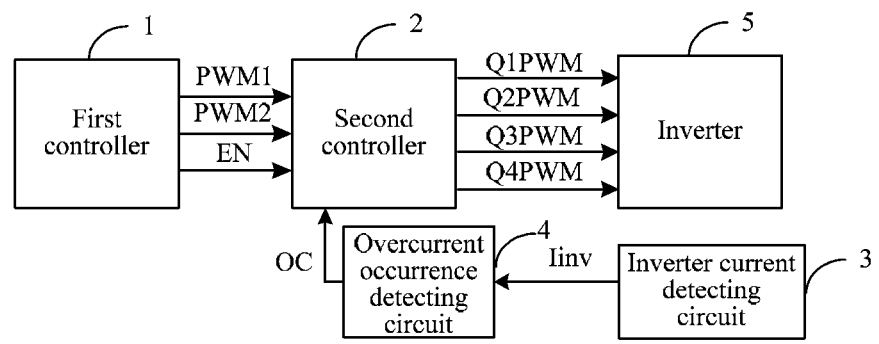
FIG. 2 is a schematic diagram of a control logic circuit in the circuit shown in FIG. 1.
Figure 3:
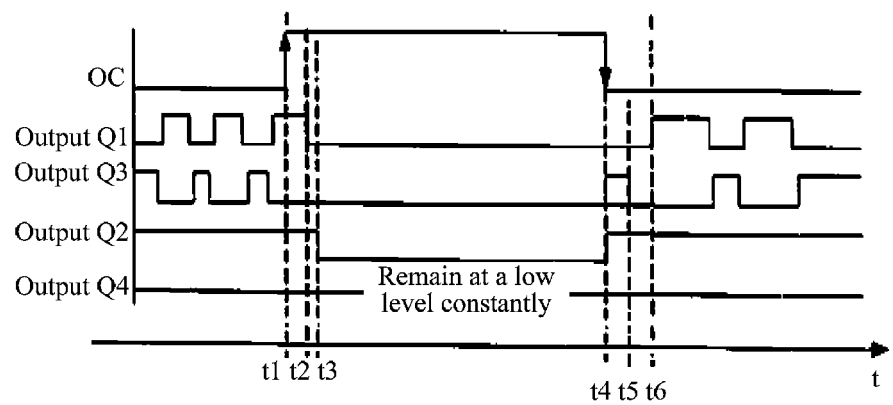
FIG. 3 is a schematic diagram of drive pulse waveforms in a current limiting manner corresponding to the circuit shown in FIG. 1 in the prior art.

An embodiment of the present disclosure provides a current limiting control method for a diode neutral-point-clamped three-level inverter. Referring to FIG. 1, a circuit of the diode neutral-point-clamped three-level inverter includes: a bridge arm formed by four switching tubes connected in series sequentially: a first switching tube Q1, a second switching tube Q2, a third switching tube Q3, and a fourth switching tube Q4. At two ends of a series branch formed by the two inner tubes Q2 and Q3, diodes D5 and D6 are connected in parallel with the series branch, and the diode D5 is connected in series with the diode D6. Besides, at two ends of each switching tube, a diode is connected in antiparallel with the switching tube.

In the current limiting control method for a diode neutral-point-clamped three-level inverter provided in the present disclosure, an overcurrent detecting signal is generated by collecting a current in the switching tubes and comparing the collected current in the switching tubes with a preset current value. Specifically, when the collected current in the switching tubes is lower than a first preset current value (that is, an exiting-current-limiting-state current value), an overcurrent invalidity signal is generated to implement the exiting-current-limiting-state logic control, that is, when the overcurrent signal turns from valid to invalid, only one inner tube in the bridge arm is turned on; after a certain time, the other inside switching tube in the bridge arm is turned on; and finally normal drive time sequence pulses of all the switching tubes are restored. In this way, at a time when the overcurrent signal turns from valid to invalid, only one inside switching tube is turned on, so that the inside switching tubes and the outside switching tubes that are turned on bear single bus voltage together. Compared with a conventional practice in which two switching tubes bear double bus voltage, voltage stress of the switching tubes is reduced.

To make the technical solutions of the application more comprehensible for a person skilled in the art, the following clearly describes the technical solutions in the embodiments of the application with reference to the accompanying drawings in the embodiments of the application. Apparently, the described embodiments are merely a part rather than all of the embodiments of the application. All other embodiments obtained by a person of ordinary skill in the art based on the embodiments of the application without creative efforts shall fall within the protection scope of the present application.

The following illustrates a current limiting method for a diode neutral-point-clamped three-level inverter provided in the present disclosure in detail by taking a main circuit of the diode neutral-point-clamped three-level inverter shown in FIG. 1 as an example.

Figure 4A:
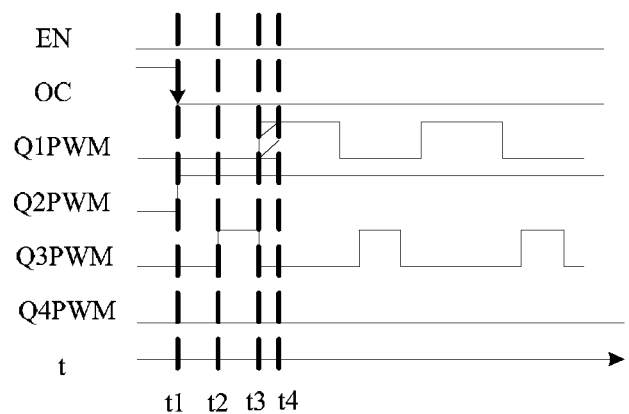
FIG. 4a is a schematic diagram of a type of voltage waveforms of drive pulses of switching tubes when a diode neutral-point-clamped three-level inverter exits a current-limiting state according to an embodiment of the present disclosure.
Figure 4B:
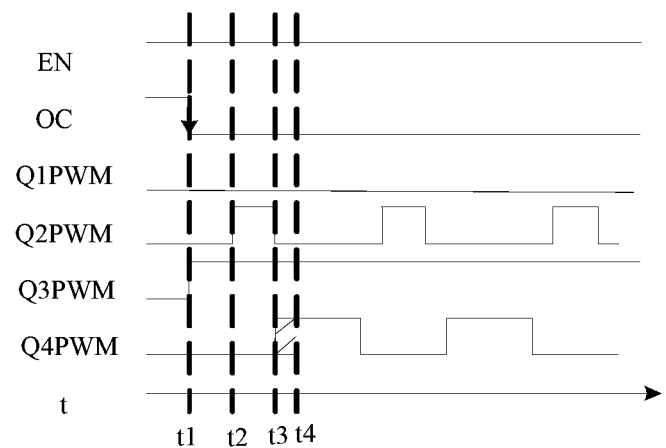
FIG. 4b is a schematic diagram of another type of voltage waveforms of drive pulses of switching tubes when a diode neutral-point-clamped three-level inverter exits a current-limiting state according to an embodiment of the present disclosure.

Referring to FIG. 4a and FIG. 4b, FIG. 4a is a schematic diagram of a type of voltage waveforms of drive pulses of switching tubes when a diode neutral-point-clamped three-level inverter exits a current-limiting state; FIG. 4b is a schematic diagram of another type of voltage waveforms of drive pulses of switching tubes when a diode neutral-point-clamped three-level inverter exits a current-limiting state.

In this embodiment, a positive/negative half cycle enabling signal is an output voltage positive/negative half cycle enabling signal EN. When the output voltage positive/negative half cycle enabling signal EN is at a low level, it indicates that an output voltage of the diode neutral-point-clamped three-level inverter is in a positive half cycle; when the output voltage positive/negative half cycle enabling signal EN is at a high level, it indicates that the output voltage of the diode neutral-point-clamped three-level inverter is in a negative half cycle. When an overcurrent signal OC is at a high level, a current in the switching tubes has a value not smaller than a preset current value, and a current-limiting stage is entered; when the overcurrent signal OC is at a low level, the current in the switching tubes has a value smaller than the preset current value, and a non-current-limiting stage is entered. Q1PWM is a drive pulse of a first switching tube Q1, Q2PWM is a drive pulse of a second switching tube Q2, Q3PWM is a drive pulse of a third switching tube Q3, and Q4PWM is a drive pulse of a fourth switching tube Q4.

As shown in FIG. 4a, the output voltage positive/negative half cycle enabling signal EN is at a low level, that is, the output voltage is in a positive half cycle. At this time, the second switching tube Q2 needs to be normally turned on, the fourth switching tube Q4 needs to be normally turned off, the first switching tube Q1 and the third switching tube Q3 need to be turned on in a complementary manner and dead time is ensured.

At the time point t1, the overcurrent signal OC turns from valid to invalid, that is, an overcurrent situation disappears. At this time, exiting-current-limiting-state logic control is implemented, and Q2PWM switches from a low level to a high level and drives the second switching tube Q2 to be turned on.

At the time point t2, Q3PWM switches from a low level to a high level and drives the third switching tube Q3 to be turned on; time is delayed until the time point t3, and Q3PWM switches from the high level to the low level to switch off the third switching tube Q3.

At the time point t3, Q3PWM switches from the high level to the low level, and at the same time, Q1PWM switches from a low level to a high level. The time difference between the drive pulses of Q1 and Q3 cannot satisfy a requirement for dead time between Q1 and Q3. Therefore, in order to ensure the dead time between the first switching tube Q1 and the third switching tube Q3, the normal drive time sequence of the four switching tubes is restored after the time point t4, that is, the drive pulse of Q1PWM in the time period between t3 and t4 is cut off.

The drive pulse Q4PWM of the fourth switching tube Q4 remains at a low level all the time, so that the fourth switching tube Q4 is normally turned off.

Specifically, as shown in FIG. 1, in the main circuit of the diode neutral-point-clamped three-level inverter, at the time point t1, Q2 is turned on, and Q1, Q3, and Q4 are all in an off state. A positive output current is taken as an example for illustration. The current is output from an output point B and flows through an inductor L, a capacitor C, a diode D5, and the second switching tube Q2, so that a potential at the point B is clamped to a potential of a neutral line N (that is, a potential of a grounding point in FIG. 1). At this time, the third switching tube Q3 and the fourth switching tube Q4 bear a voltage of a negative bus −BUS together. Compared with the conventional current limiting method, voltage stress of the switching tubes is reduced.

As shown in FIG. 4b, the output voltage positive/negative half cycle enabling signal EN is at a high level, that is, the output voltage is in a negative half cycle. In this situation, the first switching tube Q1 needs to be normally turned off, the third switching tube Q3 needs to be normally turned on, the second switching tube Q2 and the fourth switching tube Q4 need to be turned on in a complementary manner and dead time is ensured.

At the time point t1, the overcurrent signal OC turns from valid to invalid, that is, an overcurrent situation disappears. At this time, exiting-current-limiting-state logic control is implemented, and Q3PWM switches from a low level to a high level and drives the third switching tube Q3 to be turned on.

At the time point t2, the drive pulse Q2PWM of the second switching tube Q2 switches from a low level to a high level and drives the second switching tube Q2 to be turned on; time is delayed until the time point t3, and Q2PWM switches from a high level to a low level to switch off the second switching tube Q2.

As shown in FIG. 4b, at the time when Q2PWM switches from the high level to the low level, that is, at the time point t3, Q4PWM switches from a low level to a high level, and a time difference between the turn-off time of Q2 and the turn-on time of Q4 cannot satisfy a requirement for dead time between Q2 and Q4. Therefore, in order to ensure the dead time between the second switching tube Q2 and the fourth switching tube Q4, after time is delayed until the time point t4, the normal drive time sequence of the four switching tubes is restored, that is, the drive pulse of Q4PWM in the time period between t3 and t4 is cut off.

The drive pulse Q1PWM of the first switching tube Q1 remains at a low level all the time, so that the fourth switching tube Q4 is normally turned off.

As shown in FIG. 1, in the main circuit of the diode neutral-point-clamped three-level inverter, at the time point t1, Q3 is turned on, and Q1, Q2, and Q4 are all in an off state. A negative output current is taken as an example for illustration. The current flows from the line N and through the capacitor C, the inductor L, the third switching tube Q3, and the diode D6, and finally flows back to the line N. At this time, a potential at the point B is clamped to a potential of the line N, the first switching tube Q1 and the second switching tube Q2 bear a voltage of a positive bus +BUS together. Compared with the conventional current limiting method, voltage stress of the switching tubes is reduced.

In the current limiting method for a diode neutral-point-clamped three-level inverter provided in this embodiment, when a current-limiting state is exited, that is, when an overcurrent signal turns from valid to invalid, only one inside switching tube in a bridge arm is firstly turned on; after a certain time, the other switching tube in the bridge arm is then turned on; and finally normal drive time sequence pulses of all the switching tubes are restored. In this way, only one inside switching tube is turned on, so that the outside switching tube and the inside switching tube that is not turned on bear single bus voltage together. Compared with a conventional practice in which one switching tube bears single bus voltage, voltage stress of the switching tubes is reduced, and it is ensured that the voltage stress of the switching tubes does not exceed a limit when the current-limiting state is exited, which thereby prevents a phenomenon that the switching tubes fail due to excessive voltage stress.

Referring to FIG. 5a to FIG. 5d, diagrams of drive pulse waveforms of switching tubes in various exiting-current-limiting-state situations of a diode neutral-point-clamped three-level inverter are separately shown.

Figure 5A:
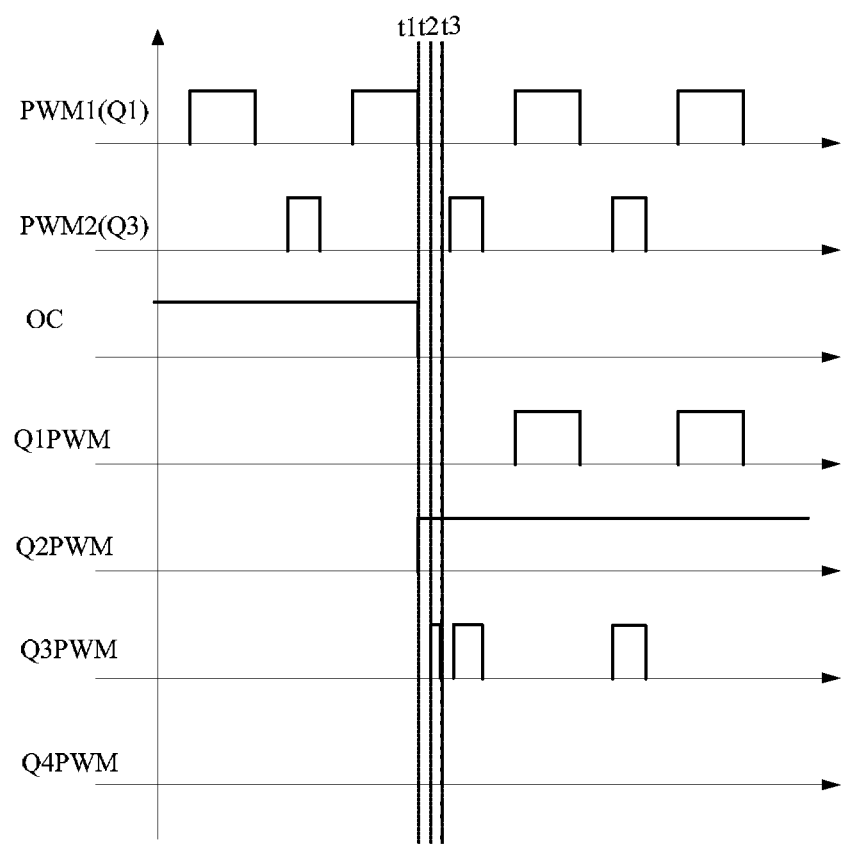
FIG. 5a is a schematic diagram of a type of drive pulse waveforms of switching tubes when a diode neutral-point-clamped three-level inverter exits a current limiting control state according to an embodiment of the present disclosure.

As shown in FIG. 5a, this waveform diagram differs from the schematic waveform diagram shown in FIG. 4a in that a time when Q3PWM switches from a high level to a low level, that is, the time point t3, is within dead time between the first switching tube Q1 and the third switching tube Q3. In this situation, the dead time between the first switching tube Q1 and the third switching tube Q3 can be ensured. Therefore, after the time point t3, the normal drive time sequence of the four switching tubes is instantly restored, and the dead time between Q1 and Q3 can be ensured.

Figure 5B:
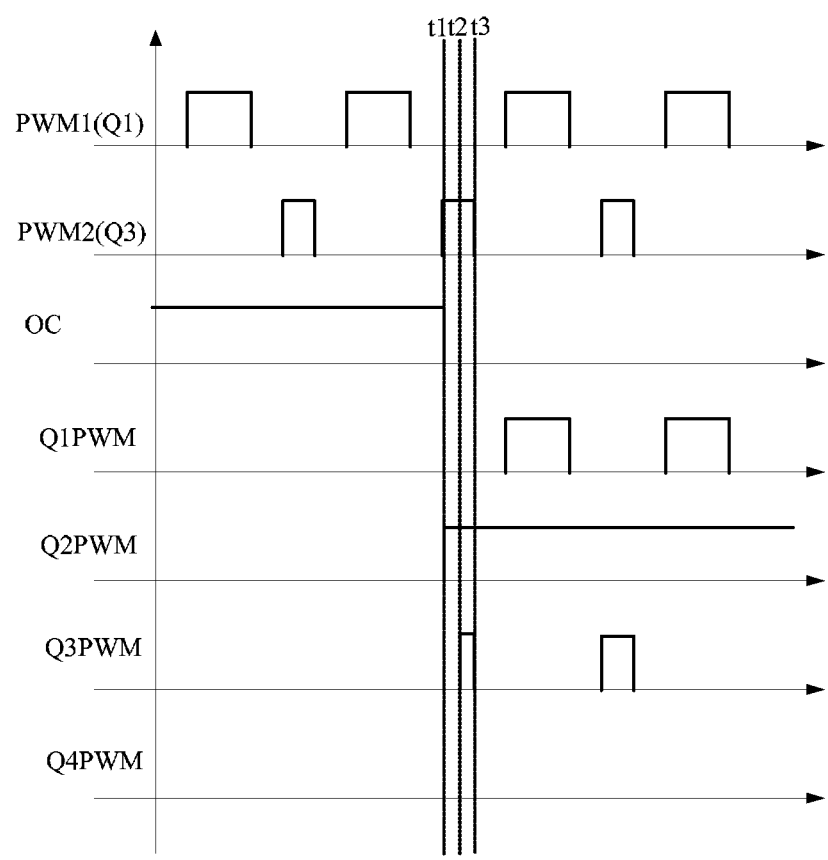
FIG. 5b is a schematic diagram of another type of drive pulse waveforms of switching tubes when a diode neutral-point-clamped three-level inverter exits a current limiting control state.

As shown in FIG. 5b, this waveform diagram differs from the schematic waveform diagram shown in FIG. 4b in that a time when Q3PWM switches from a high level to a low level, that is, the time point t3, is within a turn-on interval of the third switching tube Q3. As the normal drive pulse time sequence can be ensured, in this situation, at the time point t3, the normal drive time sequence of the four switching tubes is instantly restored, and the dead time between Q1 and Q3 can be ensured.

Figure 5C:
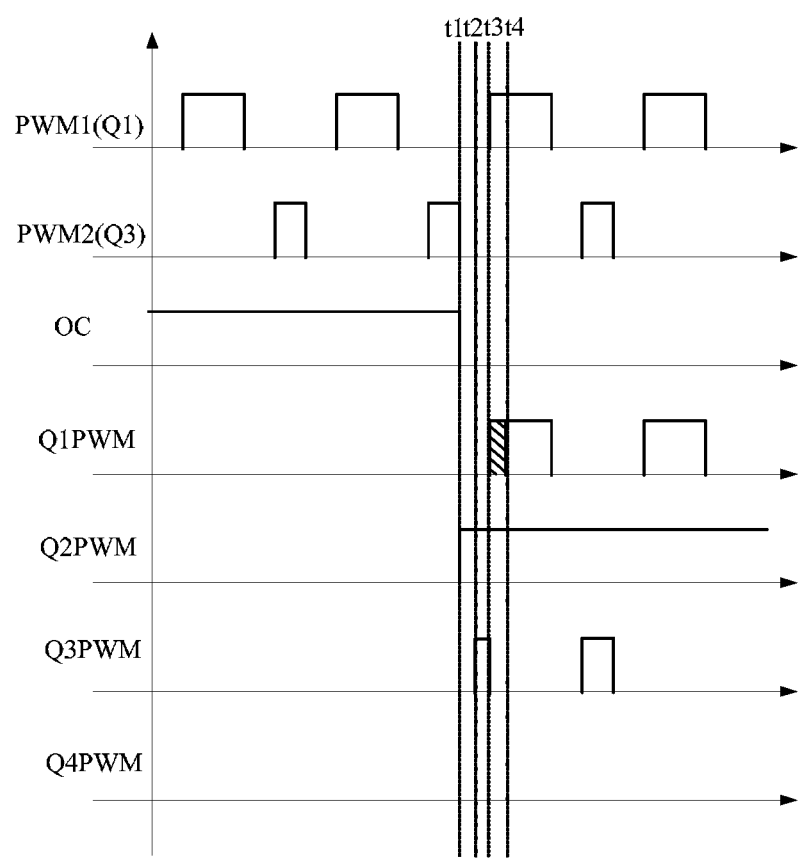
FIG. 5c is a schematic diagram of a type of drive pulse waveforms of switching tubes when a diode neutral-point-clamped three-level inverter exits a current limiting control state.

As shown in FIG. 5c, this waveform diagram differs from the schematic waveform diagram shown in FIG. 4c in that a time when Q3PWM switches from a high level to a low level, that is, the time point t3, is also a turn-on time of the first switching tube Q1, that is, a turn-off time of Q3 overlaps the turn-on time of Q1. At this time, a time difference between the turn-off time of Q3 and the turn-on time of Q1 cannot ensure dead time between Q1 and Q3. Therefore, time needs to be delayed until the time point t4 to restore the normal drive time sequence of the four switching tubes, that is, a pulse width of Q1PWM in the time period between t3 and t4 is cut off, so as to ensure the dead time between Q1 and Q3.

Figure 5D:
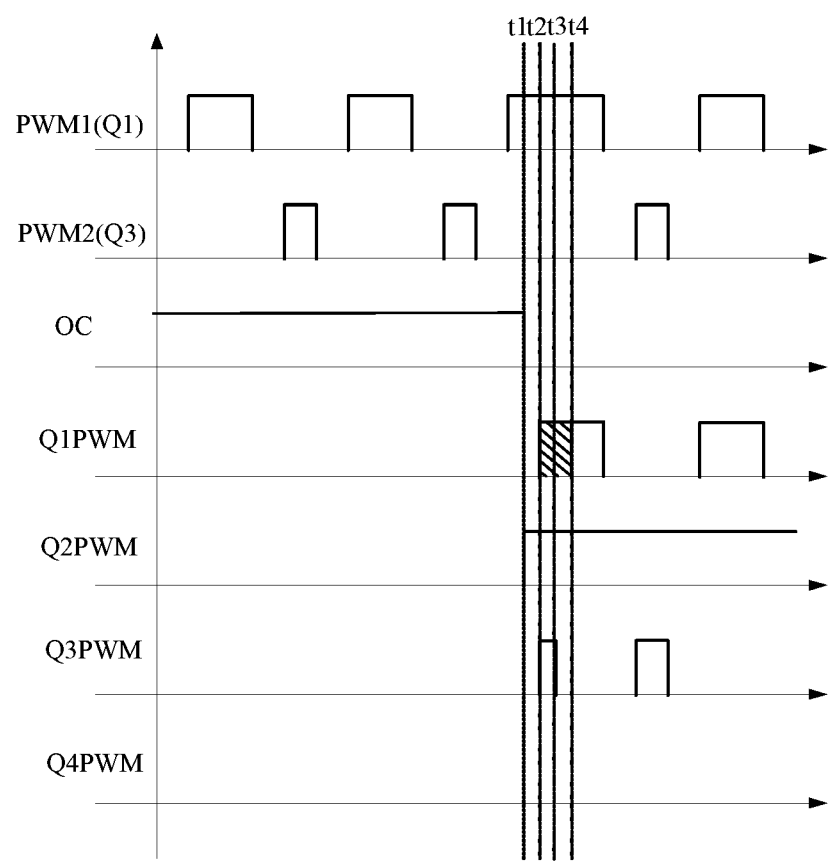
FIG. 5d is a schematic diagram of a type of drive pulse waveforms of switching tubes when a diode neutral-point-clamped three-level inverter exits a current limiting control state.

As shown in FIG. 5d, this waveform diagram differs from the schematic waveform diagram shown in FIG. 4d in that at a time when Q3PWM switches from a high level to a low level, that is, at the time point t3, dead time does not exist between Q1 and Q3. Therefore, time needs to be delayed until the time point t4 to restore the normal drive time sequence of the four switching tubes, that is, a pulse width of Q1PWM in the time period between t3 and t4 is cut off, so as to ensure the dead time between Q1 and Q3.

Referring to FIG. 6a to FIG. 6d, schematic diagrams of a type of drive pulse waveforms of switching tubes when a diode neutral-point-clamped three-level inverter exits a current limiting control state are separately shown.

Figure 6A:
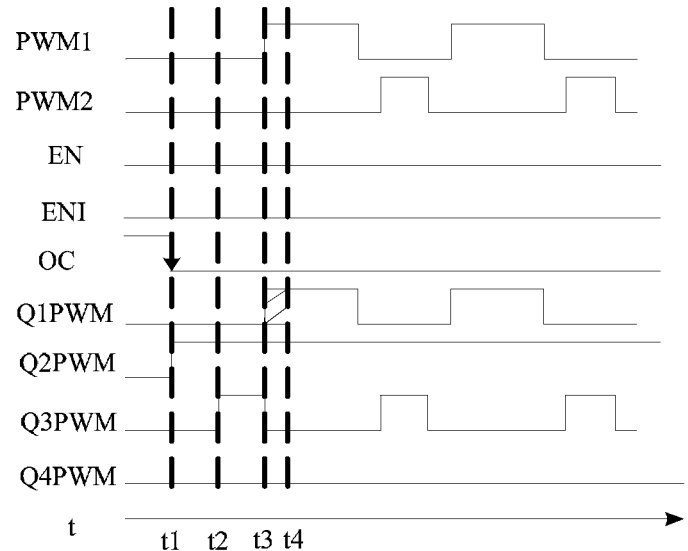
FIG. 6a is a schematic diagram of a type of drive pulse waveforms of switching tubes when a diode neutral-point-clamped three-level inverter exits a current limiting control state.

As shown in FIG. 6a, an output voltage positive/negative half cycle enabling signal EN is at a low level, and an output current positive/negative half cycle enabling signal ENI is also at a low level, which indicates that an output voltage is in a positive half cycle, and an output current is also in a positive half cycle, that is, the output current and the output voltage are in the same phase.

At the time point t1, the overcurrent signal OC turns from valid to invalid, that is, an overcurrent situation disappears. At this time, exiting-current-limiting-state logic control is implemented, and Q2PWM switches from a low level to a high level and drives the second switching tube Q2 to be turned on.

At the time point t2, Q3PWM switches from a low level to a high level and drives the third switching tube Q3 to be turned on; time is delayed until the time point t3, and Q3PWM switches from the high level to the low level to switch off the third switching tube Q3.

At the time point t3, that is, a turn-off time of Q3, overlaps a turn-on start time point of Q1, and a time difference between the turn-off time of Q3 and the turn-on time of Q1 cannot satisfy a requirement for dead time between Q1 and Q3, only after time is delayed until the time point t4, the normal drive pulse time sequence of the four switching tubes is restored, that is, a drive pulse of Q1PWM in the time period between t3 and t4 is cut off, to ensure the dead time between Q1 and Q3.

Specifically, at the time point t1, an output current in the main circuit of the diode neutral-point-clamped three-level inverter shown in FIG. 1 flows in the path: L-C-line N-D5-Q2-L. At this time, a potential at an output point B is clamped to a potential of the line N, and Q3 and Q4 bear a voltage of a negative bus –BUS together. Compared with the conventional current limiting method, voltage stress of the switching tubes is reduced.

Figure 6B:
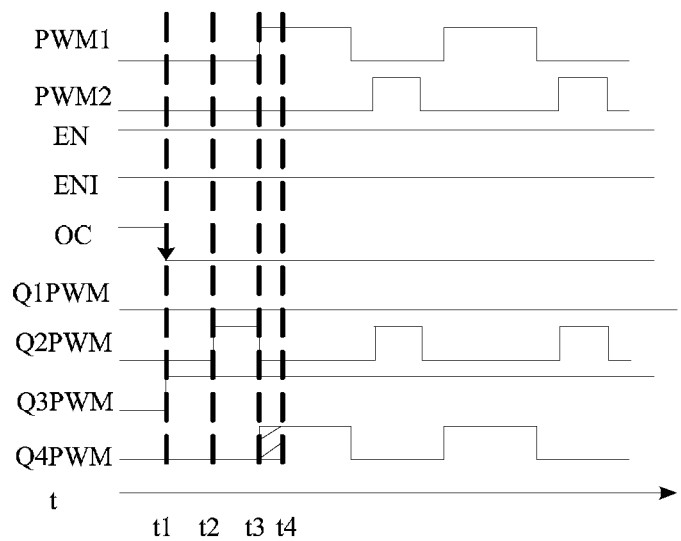
FIG. 6b is a schematic diagram of another type of drive pulses of switching tubes when a diode neutral-point-clamped three-level inverter exits a current limiting control state.

As shown in FIG. 6b, an output voltage positive/negative half cycle enabling signal EN is at a high level, and an output current positive/negative half cycle enabling signal ENI is also at a high level, which indicates that an output voltage is in a negative half cycle, and an output current is also in a negative half cycle, that is, the output current and the output voltage are in the same phase.

At the time point t1, the overcurrent signal OC turns from valid to invalid, that is, an overcurrent situation disappears. At this time, exiting-current-limiting-state logic control is implemented, and Q3PWM switches from a low level to a high level and drives the third switching tube Q3 to be turned on.

At the time point t2, Q2PWM switches from a low level to a high level and drives the second switching tube Q2 to be turned on; time is delayed until the time point t3, and Q2PWM switches from the high level to the low level to switch off the second switching tube Q2.

As the time point t3, that is, a turn-off time of Q2, overlaps a turn-on start time point of Q4, and a time difference between the turn-off time of Q2 and the turn-on time of Q4 cannot satisfy a requirement for dead time between Q2 and Q4, only after time is delayed until the time point t4, the normal drive pulse time sequence of the four switching tubes is restored, that is, a drive pulse of Q4PWM in the time period between t3 and t4 is cut off, to ensure the dead time between Q2 and Q4.

Specifically, at the time point t1, an output current in the main circuit of the diode neutral-point-clamped three-level inverter shown in FIG. 1 flows in the path: line N-C-L-Q3-D6-line N. At this time, a potential at an output point B is clamped to a potential of the line N, and Q1 and Q2 bear a voltage of a positive bus +BUS together. Compared with the conventional current limiting method, voltage stress of the switching tubes is reduced.

Figure 6C:
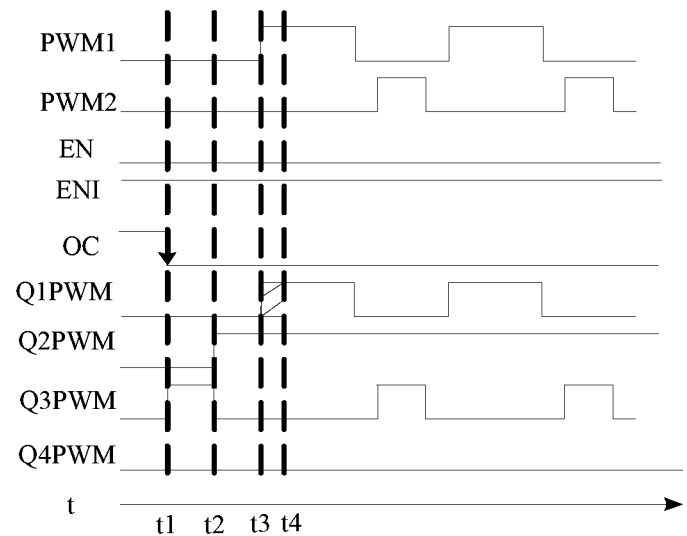
FIG. 6c is a schematic diagram of another type of drive pulse waveforms of switching tubes when a diode neutral-point-clamped three-level inverter exits a current limiting control state.

As shown in FIG. 6c, an output voltage positive/negative half cycle enabling signal EN is at a low level, and an output current positive/negative half cycle enabling signal ENI is at a high level, which indicates that an output voltage is in a positive half cycle, and an output current is in a negative half cycle.

At the time point t1, the overcurrent signal OC turns from valid to invalid, that is, an overcurrent situation disappears. At this time, exiting-current-limiting-state logic control is implemented, Q3PWM switches from a low level to a high level and drives the third switching tube Q3 to be turned on, and time is delayed until the time point t2.

At the time point t2, Q3PWM switches from a high level to a low level and turns off the third switching tube Q3. At the same time, Q2PWM switches from a low level to a high level and drives the second switching tube Q2 to be turned on. Time is delayed until the time point t3, and the normal drive pulse time sequence of the four switching tubes is restored.

Specifically, at the time point t1, an output current in the main circuit of the diode neutral-point-clamped three-level inverter shown in FIG. 1 flows in the path: line N-C-L-D2-D1-C1-line N. A potential at an output point B is clamped to a potential of the line N, and Q3 and Q4 bear a voltage of a negative bus –BUS together. Compared with the conventional current limiting method, voltage stress of the switching tubes is reduced. In order to ensure dead time between Q1 and Q3, only after time is delayed until the time point t4, the normal drive pulse time sequence of the four switching tubes is restored.

Figure 6D:
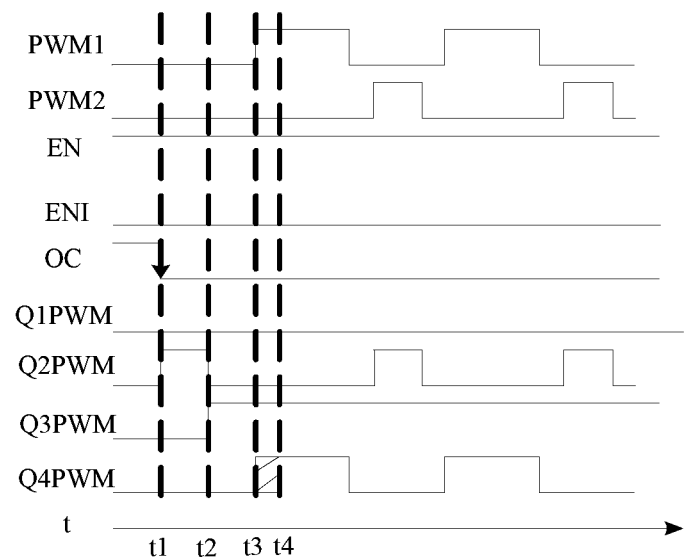
FIG. 6d is a schematic diagram of another type of drive pulse waveforms of switching tubes when a diode neutral-point-clamped three-level inverter exits a current limiting control state.

As shown in FIG. 6d, an output voltage positive/negative half cycle enabling signal EN is at a high level, and an output current positive/negative half cycle enabling signal ENI is at a low level, which indicates that an output voltage is in a negative half cycle, and an output current is in a positive half cycle.

At the time point t1, the overcurrent signal OC turns from valid to invalid, that is, an overcurrent situation disappears. At this time, exiting-current-limiting-state logic control is implemented, Q2PWM switches from a low level to a high level and drives the second switching tube Q2 to be turned on, and time is delayed until the time point t2.

At the time point t2, Q2PWM switches from a high level to a low level and turns off Q2. At the same time, Q3PWM switches from a low level to a high level and drives Q3 to be turned on. Time is delayed until the time point t3, and then the normal drive pulse time sequence of the four switching tubes is restored.

Specifically, at the time point t1, an output current in the main circuit of the diode neutral-point-clamped three-level inverter shown in FIG. 1 flows in the path: line N-C2-D4-D3-L-C-line N. At this time, a potential at an output point B is clamped to a potential of the line N, and Q1 and Q2 bear a voltage of a positive bus +BUS together. In comparison with the existing current limiting method, voltage stress of the switching tubes is reduced.

In order to ensure dead time between Q2 and Q4, only after time is delayed until the time point t4, the normal drive pulse time sequence of the four switching tubes is restored.

Referring to FIG. 7a to FIG. 7d, schematic diagrams of another type of drive pulse waveforms of switching tubes when a diode neutral-point-clamped three-level inverter exits a current limiting control state are separately shown.

Figure 7A:
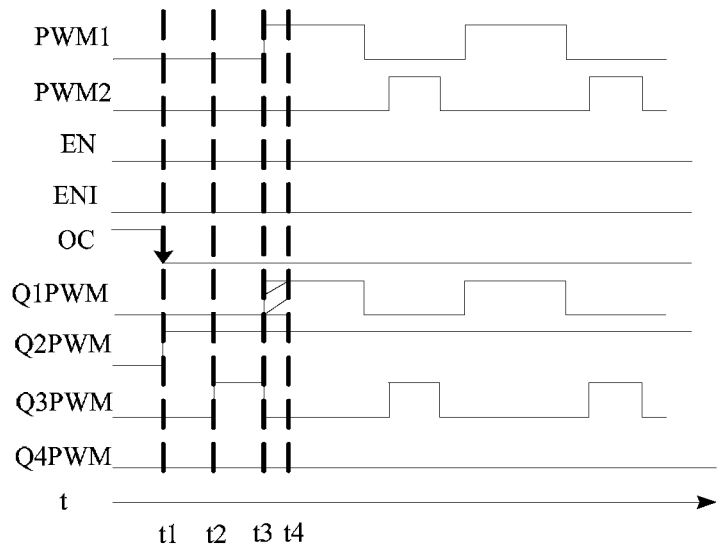
FIG. 7a is a schematic diagram of a type of drive pulse waveforms of switching tubes when a diode neutral-point-clamped three-level inverter exits a current limiting control state.

As shown in FIG. 7a, an output voltage positive/negative half cycle enabling signal EN is at a low level, and an output current positive/negative half cycle enabling signal ENI is also at a low level, which indicates that an output voltage is in a positive half cycle, and an output current is also in a positive half cycle, that is, the output current and the output voltage are in the same phase.

At the time point t1, the overcurrent signal OC turns from valid to invalid, that is, an overcurrent situation disappears. At this time, exiting-current-limiting-state logic control is implemented, and Q2PWM switches from a low level to a high level and drives the second switching tube Q2 to be turned on.

At the time point t2, Q3PWM switches from a low level to a high level and drives the third switching tube Q3 to be turned on; time is delayed until the time point t3, and Q3PWM switches from the high level to the low level to switch off the third switching tube Q3.

As the time point t3, that is, a turn-off time of Q3, overlaps a turn-on start time point of Q1, and a time difference between the turn-off time of Q3 and the turn-on time of Q1 cannot satisfy a requirement for dead time between Q1 and Q3, only after time is delayed until the time point t4, the normal drive pulse time sequence of the four switching tubes is restored, that is, a drive pulse of Q1PWM in the time period between t3 and t4 is cut off, to ensure the dead time between Q1 and Q3.

Specifically, at the time point t1, an output current in the main circuit of the diode neutral-point-clamped three-level inverter shown in FIG. 1 flows in the path: L-C-line N-D5-Q2-L. At this time, a potential at an output point B is clamped to a potential of the line N, and Q3 and Q4 bear a voltage of a negative bus −BUS together. Compared with the conventional current limiting method, voltage stress of the switching tubes is reduced.

Figure 7B:
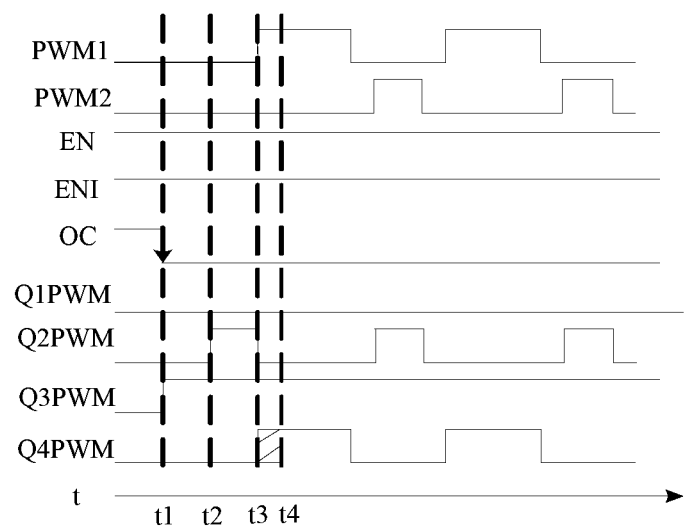
FIG. 7b is a schematic diagram of another type of drive pulse waveforms of switching tubes when a diode neutral-point-clamped three-level inverter exits a current limiting control state.

As shown in FIG. 7b, an output voltage positive/negative half cycle enabling signal EN is at a high level, and an output current positive/negative half cycle enabling signal ENI is also at a high level, which indicates that an output voltage is in a negative half cycle, and an output current is also in a negative half cycle, that is, the output current and the output voltage are in the same phase.

At the time point t1, the overcurrent signal OC turns from valid to invalid, that is, an overcurrent situation disappears. At this time, exiting-current-limiting-state logic control is implemented, and Q3PWM switches from a low level to a high level and drives the third switching tube Q3 to be turned on.

At the time point t2, Q2PWM switches from a low level to a high level and drives the second switching tube Q2 to be turned on; time is delayed until the time point t3, and Q2PWM switches from the high level to the low level to switch off the second switching tube Q2.

As the time point t3, that is, a turn-off time of Q2, overlaps a turn-on start time point of Q4, and a time difference between the turn-off time of Q2 and the turn-on time of Q4 cannot satisfy a requirement for dead time between Q2 and Q4, only after time is delayed until the time point t4, the normal drive pulse time sequence of the four switching tubes is restored, that is, a drive pulse of Q4PWM in the time period between t3 and t4 is cut off, to ensure the dead time between Q2 and Q4.

Specifically, at the time point t1, an output current in the main circuit of the diode neutral-point-clamped three-level inverter shown in FIG. 1 flows in the path: line N-C-L-Q3-D6-line N. At this time, a potential at an output point B is clamped to a potential of the line N, and Q1 and Q2 bear a voltage of a positive bus +BUS together. Compared with the conventional current limiting method, voltage stress of the switching tubes is reduced.

Figure 7C:
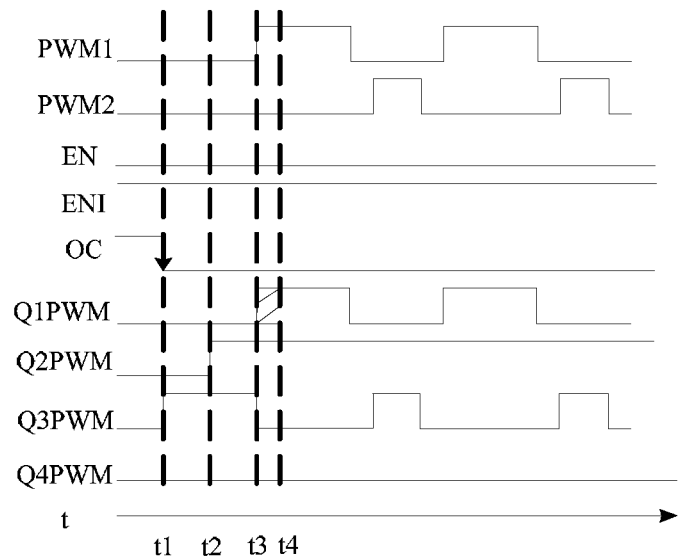
FIG. 7c is a schematic diagram of another type of drive pulse waveforms of switching tubes when a diode neutral-point-clamped three-level inverter exits a current limiting control state.

As shown in FIG. 7c, an output voltage positive/negative half cycle enabling signal EN is at a low level, and an output current positive/negative half cycle enabling signal ENI is at a high level, which indicates that an output voltage is in a positive half cycle, and an output current is in a negative half cycle.

At the time point t1, the overcurrent signal OC turns from valid to invalid, that is, an overcurrent situation disappears. At this time, exiting-current-limiting-state logic control is implemented, Q3PWM switches from a low level to a high level and drives the third switching tube Q3 to be turned on, and time is delayed until the time point t2.

At the time point t2, Q2PWM switches from a low level to a high level and drives the second switching tube Q2 to be turned on, and time is delayed until the time point t3.

At the time point t3, Q3PWM switches from a high level to a low level and turns off the third switching tube Q3, and then the normal drive pulse time sequence of the four switching tubes is restored.

As the time point t3, that is, a turn-off time of Q3, overlaps a turn-on start time point of Q1, that is, the time point t3 overlaps a rising edge of Q1PWM, and a time difference between the turn-off time of Q3 and the turn-on time of Q1 cannot satisfy a requirement for dead time between Q1 and Q3, only after time is delayed until the time point t4, the normal drive pulse time sequence of the four switching tubes is restored, that is, a drive pulse of Q1PWM in the time period between t3 and t4 is cut off, to ensure the dead time between Q1 and Q3.

Specifically, at the time point t1, an output current in the main circuit of the diode neutral-point-clamped three-level inverter shown in FIG. 1 flows in the path: line N-C-L-D2-D1-C1-line N. A potential at an output point B is clamped to a potential of the line N, and Q3 and Q4 bear a voltage of a negative bus −BUS together. Compared with the conventional current limiting method, voltage stress of the switching tubes is reduced.

Figure 7D:
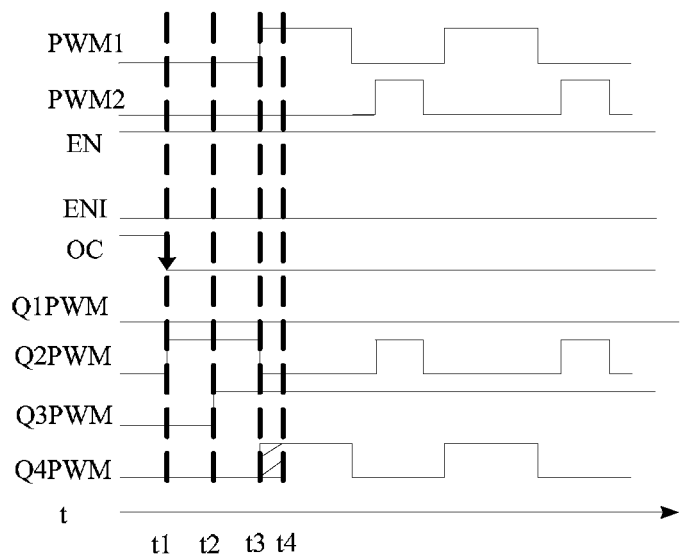
FIG. 7d is a schematic diagram of another type of drive pulse waveforms of switching tubes when a diode neutral-point-clamped three-level inverter exits a current limiting control state.

As shown in FIG. 7d, an output voltage positive/negative half cycle enabling signal EN is at a high level, and an output current positive/negative half cycle enabling signal ENI is at a low level, which indicates that an output voltage is in a negative half cycle, and an output current is in a positive half cycle.

At the time point t1, the overcurrent signal OC turns from valid to invalid, that is, an overcurrent situation disappears. At this time, exiting-current-limiting-state logic control is implemented, Q2PWM switches from a low level to a high level and drives the second switching tube Q2 to be turned on, and time is delayed until the time point t2.

At the time point t2, Q3PWM switches from a low level to a high level and drives Q3 to be turned on, and time is delayed until the time point t3.

At the time point t3, Q2PWM switches from a high level to a low level and turns off Q2, and then the normal drive pulse time sequence of the four switching tubes is restored.

As the time point t3, that is, a turn-off time of Q2, overlaps a turn-on start time point of Q4, and a time difference between the turn-off time of Q2 and the turn-on time of Q4 cannot satisfy a requirement for dead time between Q2 and Q4, only after time is delayed until the time point t4, the normal drive pulse time sequence of the four switching tubes is restored, that is, a drive pulse of Q4PWM in the time period between t3 and t4 is cut off, to ensure the dead time between Q2 and Q4.

Specifically, at the time point t1, an output current in the main circuit of the diode neutral-point-clamped three-level inverter shown in FIG. 1 flows in the path: line N-C2-D4-D3-L-C-line N. At this time, a potential at an output point B is clamped to a potential of the line N, and Q1 and Q2 bear a voltage of a positive bus +BUS together. Compared with the conventional current limiting method, voltage stress of the switching tubes is reduced.

Corresponding to the foregoing current limiting method for a diode neutral-point-clamped three-level inverter, the present disclosure further provides a diode neutral-point-clamped three-level inverter circuit.

Figure 8:
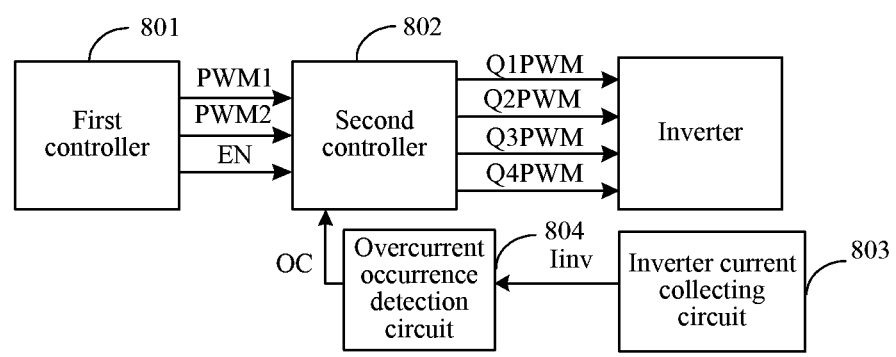
FIG. 8 is a schematic structural diagram of a type of diode neutral-point-clamped three-level inverter circuit according to an embodiment of the present disclosure.

Referring to FIG. 8, a schematic structural diagram of a type of diode neutral-point-clamped three-level inverter circuit according to an embodiment of the present disclosure is shown.

The circuit at least includes: a bridge arm formed by four switching tubes connected in series sequentially and a detection control circuit, where the detection control circuit includes: a first controller 801, a second controller 802, an inverter current collecting circuit 803, and an overcurrent occurrence detecting circuit 804, where the inverter current collecting circuit 803 is configured to collect a current in the switching tubes and provide the overcurrent occurrence detecting circuit with the collected current;

the overcurrent occurrence detecting circuit 804 is configured to detect whether the current collected by the inverter current collecting circuit in the switching tubes has a value greater than a preset current value, and if the preset current value is exceeded, generate a corresponding overcurrent signal OC and provide the second controller with the overcurrent signal;

the first controller 801 is configured to generate two paths of sinusoidal pulse width modulation SPWM pulse signals that include dead time, namely, PWM1 and PWM2, as well as a positive/negative half cycle enabling signal EN, where the positive/negative half cycle enabling signal is used for indicating a positive/negative half cycle state of an output electric signal of the circuit; and the second controller 802 is configured to: when receiving an overcurrent invalidity signal which indicates that the current in the switching tubes decreases from a value greater than the preset current value to a value not greater than the preset current value, drive one switching tube of switching tubes inside the bridge arm to be turned on according to the overcurrent invalidity signal and the positive/negative half cycle enabling signal; after a first delay time, drive the other switching tube of the inside switching tubes to be turned on, where the positive/negative half cycle enabling signal indicates a positive/negative half cycle state of an output electric signal of the inverter circuit; after a second delay time, control one switching tube of the inside switching tubes to be turned off and the other switching tube to be normally turned on; and then control all the switching tubes to be turned on or off according to a normal time sequence.

Specifically, the time sequence of drive pulses output by the second controller is the same as the exiting-current-limiting-state logic control time sequence of the current limiting circuit of the diode neutral-point-clamped three-level inverter, which is not described herein again.

It should be noted that, terms in the present application such as first and second are only used to distinguish one entity or operation from another entity or operation, and do not necessarily require or imply that any actual relationship or sequence exists between these entities or operations. Moreover, terms "includes", "include" or any other variants thereof are intended to cover a nonexclusive inclusion, so that a process, a method, an object or a device that includes a series of elements not only includes such elements, but also includes other elements that are not specified expressly, or may include inherent elements of the procedure, the method, the object or the device. An element limited by a sentence "includes one . . . " does not, without more constraints, exclude the existence of additional identical elements in the process, method, object or device that includes the element.

The foregoing descriptions are merely specific embodiments of the present disclosure. It should be noted by a person of ordinary skill in the art that modifications and variations may be made without departing from the principle of the present disclosure, and the modifications and variations should still be construed as falling within the protection scope of the present disclosure.

What is claimed is:

1. A current limiting method for a diode neutral-point-clamped three-level inverter circuit, wherein the diode neutral-point-clamped three-level inverter circuit comprises a bridge arm formed by four switching tubes connected in series sequentially, wherein the four switching tubes include two outside switching tubes and two inside switching tubes, wherein the method comprises:
   when an inverter current in the four switching tubes decreases to a value not greater than a first preset current value, driving one switching tube of the inside switching tubes to be turned on, and after a first delay time, driving the other inside switching tube to be turned on;
   after a second delay time, controlling one switching tube of the inside switching tubes to be turned off and maintaining the other switching tube of the inside switching tubes to be turned on;
   determining that an end time of the second delay time is within dead time, wherein the dead time is used for avoiding an inside switching tube and an outside switching tube being turned on at the same time; and
   controlling all four of the switching tubes to be turned on or off according to a control time sequence of the diode neutral-point-clamped three-level inverter circuit, wherein the step of controlling all four of the switching tubes to be turned on or off according to the control time sequence is performed after a third delay time, wherein the third delay time is used for ensuring the dead time, and wherein the inside switching tube is any one of the two inside switching tubes, and the outside switching tube is one of the two outside switching tubes and has no direct connection with the inside switching tube.

2. The method according to claim 1, wherein:
   when an output voltage is in a positive half voltage cycle, driving an inside switching tube in a switching tube branch connected to a positive bus in the diode neutral-point-clamped three-level inverter circuit to be turned on; after the first delay time, driving an inside switching tube in a switching tube branch connected to a negative bus in the diode neutral-point-clamped three-level inverter circuit to be turned on; and, after the second delay time, turning off the inside switching tube in the switching tube branch connected to the negative bus in the diode neutral-point-clamped three-level inverter circuit; and
   when the output voltage is in a negative half voltage cycle, driving the inside switching tube in the switching tube branch connected to the negative bus in the diode neutral-point-clamped three-level inverter circuit to be turned on; after the first delay time, driving the inside switching tube in the switching tube branch connected to the positive bus in the diode neutral-point-clamped three-level inverter circuit to be turned on; and, after the second delay time, turning off the inside switching tube in the switching tube branch connected to the positive bus in the diode neutral-point-clamped three-level inverter circuit.

3. The method according to claim 1, wherein:
   when an output voltage is in a positive half voltage cycle and an output current is in a positive half current cycle, driving an inside switching tube in a switching tube branch connected to a positive bus in the diode neutral-point-clamped three-level inverter circuit to be turned on; after the first delay time, driving an inside switching tube in a switching tube branch connected to a negative bus in the diode neutral-point-clamped three-level inverter circuit to be turned on; and, after the second delay time, turning off the inside switching tube in the switching tube branch connected to the negative bus in the diode neutral-point-clamped three-level inverter circuit;

when the output voltage is in a negative half voltage cycle and the output current is in a negative half current cycle, driving the inside switching tube in the switching tube branch connected to the negative bus in the diode neutral-point-clamped three-level inverter circuit to be turned on; after the first delay time; driving the inside switching tube in the switching tube branch connected to the positive bus in the diode neutral-point-clamped three-level inverter circuit to be turned on; and, after the second delay time, turning off the inside switching tube in the switching tube branch connected to the positive bus in the diode neutral-point-clamped three-level inverter circuit;

when the output voltage is in a positive half voltage cycle and the output current is in a negative half current cycle, driving the inside switching tube in the switching tube branch connected to the negative bus in the diode neutral-point-clamped three-level inverter circuit to be turned on; after the first delay time, turning off the inside switching tube and driving the inside switching tube in the switching tube branch connected to the positive bus in the diode neutral-point-clamped three-level inverter circuit to be turned on; and, after the second delay time, controlling all four of the switching tubes to be turned on or off according to a normal time sequence; and when the output voltage is in a negative half voltage cycle and the output current is in a positive half current cycle, driving the inside switching tube in the switching tube branch connected to the positive bus in the diode neutral-point-clamped three-level inverter circuit to be turned on; after the first delay time, turning off the inside switching tube and driving the inside switching tube in the switching tube branch connected to the negative bus in the diode neutral-point-clamped three-level inverter circuit to be turned on; and, after the second delay time, controlling all four of the switching tubes to be turned on or off according to the normal time sequence.

4. The method according to claim 1, wherein:

when an output voltage is in a positive half voltage cycle and an output current is in a positive half current cycle, driving an inside switching tube in a switching tube branch connected to a positive bus in the diode neutral-point-clamped three-level inverter circuit to be turned on; after the first delay time, driving an inside switching tube in a switching tube branch connected to a negative bus in the diode neutral-point-clamped three-level inverter circuit to be turned on; and, after the second delay time, turning off the inside switching tube in the switching tube branch connected to the negative bus in the diode neutral-point-clamped three-level inverter circuit;

when the output voltage is in a negative half voltage cycle and the output current is in a negative half current cycle, driving the inside switching tube in the switching tube branch connected to the negative bus in the diode neutral-point-clamped three-level inverter circuit to be turned on; after the first delay time; driving the inside switching tube in the switching tube branch connected to the positive bus in the diode neutral-point-clamped three-level inverter circuit to be turned on; and, after the second delay time, turning off the inside switching tube in the switching tube branch connected to the positive bus in the diode neutral-point-clamped three-level inverter circuit;

when the output voltage is in a positive half voltage cycle and the output current is in a negative half current cycle, driving the inside switching tube in the switching tube branch connected to the negative bus in the diode neutral-point-clamped three-level inverter circuit to be turned on; after the first delay time; driving the inside switching tube in the switching tube branch connected to the positive bus in the diode neutral-point-clamped three-level inverter circuit to be turned on; and, after the second delay time, turning off the inside switching tube in the switching tube branch connected to the negative bus in the diode neutral-point-clamped three-level inverter circuit, and then controlling all four of the switching tubes to be turned on or off according to a normal time sequence;

when the output voltage is in a negative half voltage cycle and the output current is in a positive half current cycle, driving the inside switching tube in the switching tube branch connected to the positive bus in the diode neutral-point-clamped three-level inverter circuit to be turned on; after the first delay time; driving the inside switching tube in the switching tube branch connected to the negative bus in the diode neutral-point-clamped three-level inverter circuit to be turned on; and, after the second delay time, turning off the inside switching tube in the switching tube branch connected to the positive bus in the diode neutral-point-clamped three-level inverter circuit, and then controlling all four of the switching tubes to be turned on or off according to the normal time sequence.

5. The method according to claim 2, wherein before the step of controlling all four of the switching tubes to be turned on or off according to the control time sequence, the method further comprises:

determining that an end time of the second delay time is within dead time, wherein the dead time is used for avoiding an inside switching tube and an outside switching tube being turned on at the same time;

wherein the step of controlling all four of the switching tubes to be turned on or off according to the control time sequence is performed after a third delay time; and wherein the third delay time is used for ensuring the dead time, and wherein the inside switching tube is any one of the two inside switching tubes, and the outside switching tube is one of the two outside switching tubes and has no direct connection with the inside switching tube.

6. The method according to claim 3, wherein before the step of controlling all four of the switching tubes to be turned on or off according to the normal time sequence, the method further comprises:

determining that an end time of the second delay time is within dead time, wherein the dead time is used for avoiding an inside switching tube and an outside switching tube being turned on at the same time;

wherein the step of controlling all four of the switching tubes to be turned on or off according to the control time sequence is performed after a third delay time; and wherein the third delay time is used for ensuring the dead time, and wherein the inside switching tube is any one of the two inside switching tubes, and the outside switching tube is one of the two outside switching tubes and has no direct connection with the inside switching tube.

7. The method according to claim 4, wherein before the step of controlling all four of the switching tubes to be turned on or off according to the normal time sequence, the method further comprises:

determining that an end time of the second delay time is within dead time, wherein the dead time is used for avoiding an inside switching tube and an outside switching tube being turned on at the same time;

wherein the step of controlling all four of the switching tubes to be turned on or off according to the control time sequence is performed after a third delay time; and wherein the third delay time is used for ensuring the dead time, and wherein the inside switching tube is any one of the two inside switching tubes, and the outside switching tube is one of the two outside switching tubes and has no direct connection with the inside switching tube.

8. A diode neutral-point-clamped three-level inverter circuit, comprising:

a bridge arm formed by four switching tubes connected in series sequentially, wherein the four switching tubes include two outside switching tubes and two inside switching tubes; and a detection control circuit, which includes:

a first controller configured to generate at least two paths of sinusoidal pulse width modulation (SPWM) pulse signals that include dead time, a second controller, an overcurrent occurrence detecting circuit, and an inverter current collecting circuit configured to collect an inverter current in the four switching tubes and provide the collected current to the overcurrent occurrence detecting circuit, wherein the overcurrent occurrence detecting circuit is configured to detect whether the collected inverter current has a value greater than a preset current value, and if the collected inverter current exceeds the preset current value, generate a corresponding overcurrent detection signal and provide the overcurrent detection signal to the second controller, wherein the second controller is configured to:

when receiving an overcurrent detection signal indicating that the collected current decreases from a value greater than the preset current value to a value not greater than the preset current value, drive one inside switching tube to be turned on; after a first delay time, drive the other inside switching tube to be turned on; after a second delay time, control one inside switching tube to be turned off and maintain the other inside switching tube to be turned on;

determine whether an end time of the second delay time is within dead time between an inside switching tube and an outside switching tube; and, if yes, after a third delay time, control all four of the switching tubes to be turned on or off according to a normal time sequence of the diode neutral-point-clamped three-level inverter circuit, wherein the third delay time is used for ensuring the dead time between the inside switching tube and the outside switching tube, and wherein the inside switching tube is any one of the two inside switching tubes, and the outside switching tube is one of the two outside switching tubes and has no direct connection with the inside switching tube.

9. The circuit according to claim 8, wherein the bridge arm comprises a first switching tube, a second switching tube, a third switching tube, and a fourth switching tube that are connected in series sequentially, wherein the first switching tube and the fourth switching tube are outside switching tubes, and the second switching tube and the third switching tube are inside switching tubes;

when an output voltage is in a positive half voltage cycle, the second controller is configured to: drive the second switching tube to be turned on; after the first delay time, drive the third switching tube to be turned on; after the second delay time, switch off the third switching tube; and restore normal drive time sequence pulses of all four of the switching tubes;

when the output voltage is in a negative half voltage cycle, the second controller is configured to: drive the third switching tube to be turned on; after the first delay time, drive the second switching tube to be turned on; after the second delay time, switch off the second switching tube; and restore normal drive time sequence pulses of all four of the switching tubes.

10. The circuit according to claim 8, wherein the bridge arm comprises a first switching tube, a second switching tube, a third switching tube, and a fourth switching tube that are connected in series sequentially, wherein the first switching tube and the fourth switching tube are outside switching tubes, and the second switching tube and the third switching tube are inside switching tubes;

when an output voltage is in a positive half output voltage cycle and an output current is in a positive half output current cycle, the second controller is configured to: drive the second switching tube to be turned on; after the first delay time, drive the third switching tube to be turned on; after the second delay time, switch off the third switching tube; and restore normal drive time sequence pulses of all four of the switching tubes;

when the output voltage is in a negative half output voltage cycle and the output current is in a negative half output current cycle, the second controller is configured to: drive the third switching tube to be turned on; after the first delay time, drive the second switching tube to be turned on; after the second delay time, switch off the second switching tube; and restore the normal drive time sequence pulses of all four of the switching tubes;

when the output voltage is in a positive half output voltage cycle and the output current is in a negative half output current cycle, the second controller is configured to: drive the third switching tube to be turned on; after the first delay time, switch off the third switching tube and drive the second switching tube to be turned on; and after the second delay time, restore the normal drive time sequence pulses of all four of the switching tubes; and when the output voltage is in a negative half output voltage cycle and the output current is in a positive half output current cycle, the second controller is configured to: drive the second switching tube to be turned on; after the first delay time, switch off the second switching tube and drive the third switching tube to be turned on; and after the second delay time, restore the normal drive time sequence pulses of all four of the switching tubes.

11. The circuit according to claim 8, wherein the bridge arm comprises a first switching tube, a second switching tube, a third switching tube, and a fourth switching tube that are connected in series sequentially, wherein the first switching tube and the fourth switching tube are outside switching tubes, and the second switching tube and the third switching tube are inside switching tubes;

when an output voltage is in a positive half output voltage cycle and an output current is in a positive half output current cycle, the second controller is configured to: drive the second switching tube to be turned on; after the first delay time, drive the third switching tube to be turned on; after the second delay time, switch off the third switching tube; and restore normal drive time sequence pulses of all four of the switching tubes;

when the output voltage is in a negative half output voltage cycle and the output current is in a negative half output current cycle, the second controller is configured to: drive the third switching tube to be turned on; after the first delay time, drive the second switching tube to be turned on; after the second delay time, switch off the second switching tube; and restore the normal drive time sequence pulses of all four of the switching tubes;

when the output voltage is in a positive half output voltage cycle and the output current is in a negative half output current cycle, the second controller is configured to: drive the third switching tube to be turned on; after the first delay time, drive the second switching tube to be turned on; after the second delay time, switch off the third switching tube; and restore the normal drive time sequence pulses of all four of the switching tubes;

when the output voltage is in a negative half output voltage cycle and the output current is in a positive half output current cycle, the second controller is configured to: drive the second switching tube to be turned on; after a first delay time, drive the third switching tube to be turned on; after a second delay time, switch off the second switching tube; and restore normal drive time sequence pulses of all four of the switching tubes.

\* \* \* \* \*